United States Patent [19]
Hatch et al.

[11] Patent Number: 6,118,636
[45] Date of Patent: *Sep. 12, 2000

[54] INERTIAL LATCH MECHANISM WITH OPPOSING LATCH MEMBERS

[75] Inventors: R. Daniel Hatch, Bountiful; Jay A. Muse, Centerville, both of Utah

[73] Assignee: Iomega Corporation, Roy, Utah

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/096,777

[22] Filed: Jun. 12, 1998

Related U.S. Application Data

[63] Continuation-in-part of application No. 08/924,722, Aug. 29, 1997.

[51] Int. Cl.⁷ ........................................................ G11B 5/54
[52] U.S. Cl. ............................................................ 360/256.4
[58] Field of Search .................................. 360/105, 106, 360/97.02, 97.03, 97.04, 86, 256.4

[56] References Cited

U.S. PATENT DOCUMENTS

| | | | |
|---|---|---|---|
| 4,550,599 | 11/1985 | Bridge | 73/151 |
| 4,562,500 | 12/1985 | Bygdnes | 360/105 |
| 4,734,804 | 3/1988 | Hanabusa | 360/106 |
| 5,149,171 | 9/1992 | Gilevich et al. | 297/94 |
| 5,189,576 | 2/1993 | Morehouse et al. | 360/105 |
| 5,208,713 | 5/1993 | Lindsay et al. | 360/105 |
| 5,286,986 | 2/1994 | Kihara et al. | 257/215 |
| 5,296,986 | 3/1994 | Morehouse et al. | 360/106 |
| 5,341,259 | 8/1994 | Amirkiai et al. | 360/105 |
| 5,346,281 | 9/1994 | Hughes | 297/367 |
| 5,377,065 | 12/1994 | Morehouse et al. | 360/105 |
| 5,404,257 | 4/1995 | Alt | 360/105 |
| 5,543,986 | 8/1996 | Albrecht | 360/105 |
| 5,612,842 | 3/1997 | Hickox et al. | 360/105 |
| 5,623,384 | 4/1997 | Hickox et al. | 360/105 |
| 5,742,455 | 4/1998 | Boutaghou | 360/105 |
| 5,875,075 | 2/1999 | Hickox | 360/105 |
| 5,907,453 | 5/1999 | Wood et al. | 360/106 |

*Primary Examiner*—Craig A. Renner
*Attorney, Agent, or Firm*—Woodcock Washburn Kurtz Mackiewicz & Norris LLP

[57] ABSTRACT

An apparatus protects an actuator from shock forces. The apparatus comprises an inertial latch that has two opposing latch members. In response to a force from a first direction, the first latch member operates to force the actuator to a predetermined position. In response to a force from an opposite direction the second latch member operates to force the actuator to the predetermined position.

15 Claims, 11 Drawing Sheets

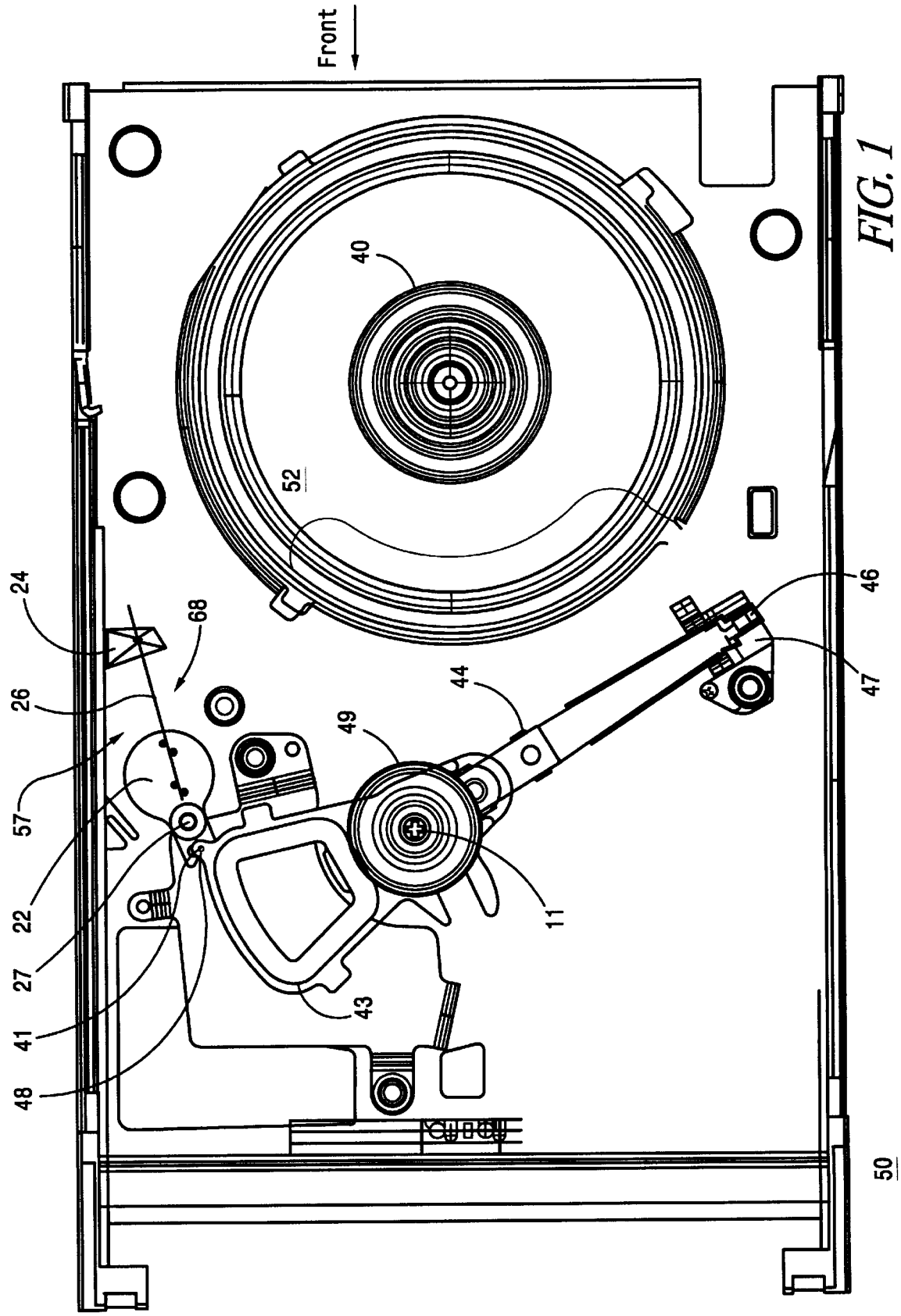

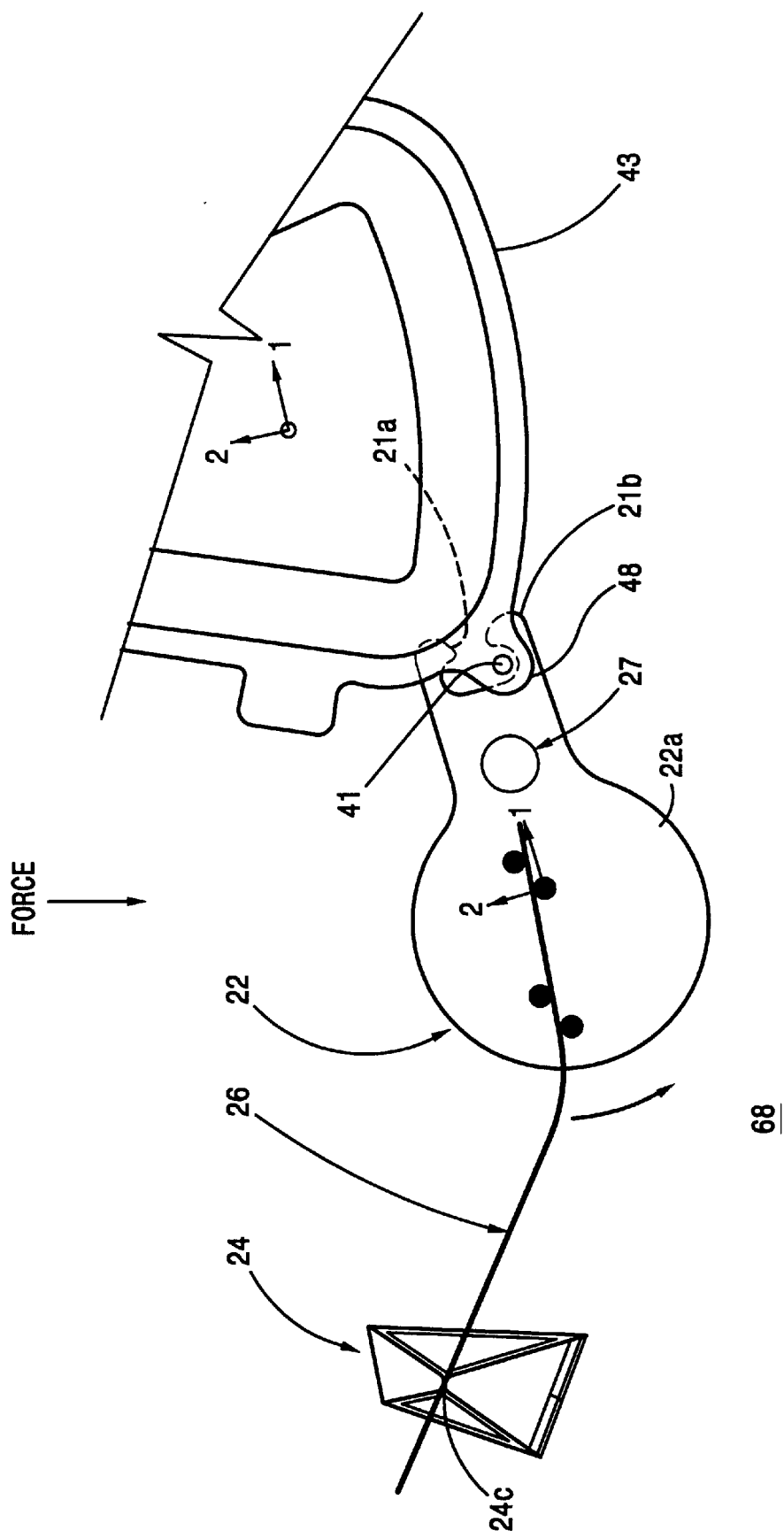

INERTIAL LATCH MECHANISM WITH OPPOSING LATCH MEMBERS

This application is a continuation-in-part of application Ser. No. 08/924,722, filed Aug. 29, 1997.

BACKGROUND OF THE INVENTION

This invention relates to disk drive systems. More particularly, the invention relates to the protection of disk drive actuators from mechanical shock forces.

Disk based data storage devices for storing digital electronic information have been in use in the computer industry for several decades. The storage devices operate by storing digital information on magnetic disk media, which can be either rigid or flexible and are mounted on a rotating hub. These storage devices are commonly referred to as disk drives. Disk drives come in two varieties: removable media and fixed media drives.

Removable media drives accept the disk media in the form of a removable cartridge. When the cartridge is inserted into a disk drive, a spindle motor in the drive couples with the disk hub in order to rotate the disk within the cartridge at a given speed. The outer shell of the cartridge typically has a media access opening proximate one edge. The access opening provides the recording heads of the drive with access to the disk. To cover the head access opening when the cartridge is not in use, a shutter or door mechanism is provided that prevents dust or other contaminants from entering the cartridge and settling on the recording surface of the disk. The shutter is commonly biased to a closed position with a spring bias. To open the shutter and gain access to the media, the drive employs a mechanism that overcomes the spring bias. In fixed media drives, by contrast, the disk hub is permanently attached to the spindle motor.

Disk drives typically employ either a linear actuator mechanism or a rotary actuator mechanism. The actuator positions the read/write head(s) of the disk drive on the recording surface(s) of the disk. The linear or rotary actuators must be able to move off, and away from, the storage medium to a retracted position, also commonly referred to as the parked position. This retracted position prevents damage to the head(s), for example, when a cartridge is inserted and removed from the disk drive or when the drive is moved. Moreover, many removable cartridge disk drives employ a pair of opposing read/write heads for recording and reproducing information on both sides of a storage medium. Typically, the opposing heads are disposed on flexible suspension arms at the distal end of an actuator that allow the heads to fly closely over the respective surfaces of the rotating disk.

Increasingly, disk drives must meet rigorous mechanical shock and vibration standards. Rigorous standards are necessary because current drive applications include hand held computers, digital cameras, and other portable computer appliances. The portable nature of these applications increase the likelihood that the drive will be subject to shocks and vibrations. For example, the computer appliance may be dropped or jarred. When experiencing mechanical shock or vibration, the actuator could inadvertently move from its retracted position causing serious damage to delicate drive components.

The protection of actuators from mechanical shocks and vibration has been addressed by prior art mechanisms. For example, U.S. Pat. No. 5,404,257 (Alt) has used an inertial latch mechanism that allegedly prevents a disk drive actuator from moving out of a retracted position during mechanical shocks. The Alt inertial latch mechanism accomplishes this feat by employing an inertial body and pivotable latch member. When a mechanical shock is experienced by the drive, the shock force causes the inertial body to contact the latch. As a result, the latch member closes on an abutment on the actuator and prevents it from moving completely out of the parked position. The latching is accomplished without the aid of electrical power.

There are drawbacks to the prior art inertial latch mechanisms. For example, in the case of a series of shocks, the actuator may travel slightly away from the desired park position with each shock. Because there is no mechanism to return the actuator to the fully parked position, eventually, after the series of shocks, the actuator may travel out of the reach of the inertial latch. The result is that the inertial latch could fail to close on the actuator abutment during one of the shocks, resulting in failure of the inertial latch mechanism and damage to the drive.

Thus there is a need for an improved inertial latch mechanism that overcomes the drawbacks of the prior art.

SUMMARY OF THE INVENTION

The present invention is directed to a mechanism for restraining a movable disk drive component in response to an external shock force. The mechanism comprises a mass member having a pivot point. The pivot point is located substantially proximate to the center of mass so that the mass pivots in response to an external force. The mechanism also comprises a spring member that biases the mass to a predefined position. Additionally, two latch members are coupled to the mass member, each latch member having a protruding cammed end that is adapted to engage the component. The latch members are arranged such that their respective cammed ends protrude in opposing directions. Furthermore the latch members are coupled to the mass member so that the center of weight of the inertial mass is substantially opposite to the latch members on the other side of the pivot point. Of course, other configurations are of the latch members are possible in which the center of weight is not on the other side of the pivot point. For example, the center of weight and the latch members could both be on the same side of the pivot.

The spring member preferably comprises a spring rod. A v-block having two opposing side walls separated by a gap is used to restrain the spring rod at one end. The spring rod is coupled to the inertial mass at one end and extends into the gap between the side walls at the other end. Thus, the spring rod is not fixed to the v-block but is permitted to slide on the v-block within the gap.

The component has a mechanism that is latched onto by the latch member(s) during a shock force. Preferably, that mechanism comprises a downwardly extending pin attached to the component. And, each protruding cammed end of the latch members protrudes in a direction toward the pin.

When a shock force is experienced, the latch member accomplished two tasks: First it prevents further movement of the component; and second it moves the component to a predetermined position, if the component has moved from that position. To provide the force necessary to move the component, a weight of the inertial mass is selected so as to be able to move the component when a shock force is experienced.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIG. 1 is a top plan view of a disk drive according to the present invention;

FIGS. 4C and 4D show top plan views of the operation of inertial latch mechanism in response to a shock force;

DETAILED DESCRIPTION OF PREFERRED EMBODIMENT

Figure 2A:
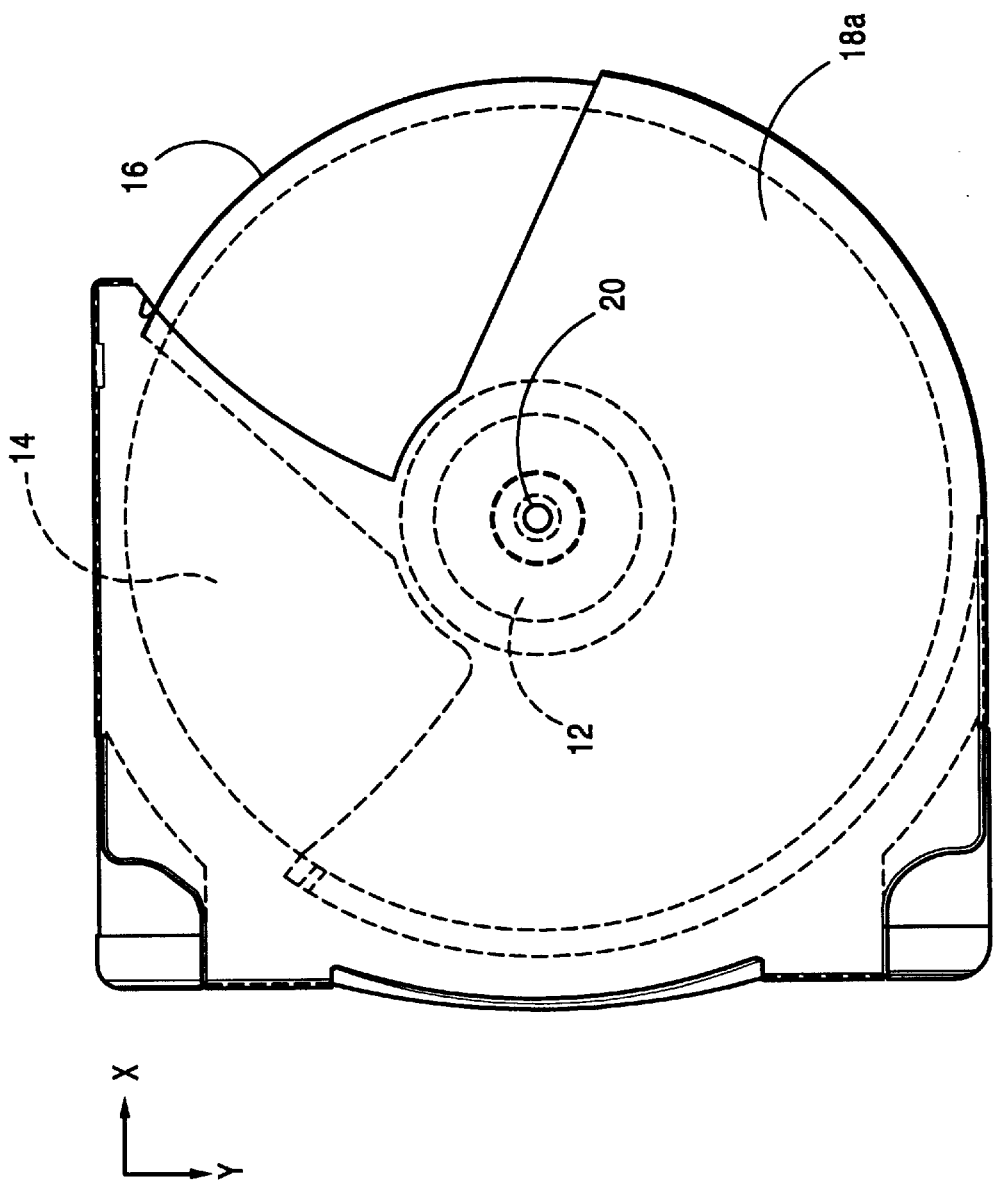
FIG. 2A is a top view of an exemplary cartridge for use with the present invention.

The present invention provides a inertial latch mechanism for a disk drive actuator. Throughout the description, a preferred embodiment of the invention is described in connection with a removable media disk drive, and the drive is shown having a rotary actuator. Moreover, a disk cartridge is shown with particular dimensions and a particular shape. However, the particular disk drive and cartridge shown only illustrate the operation of the present invention and are not intended as limitations. The invention is equally applicable to other disk drives including fixed media disk drives and removable media disk drives that accept differently sized and shaped cartridge. Accordingly, the invention should not be limited to the particular drive or cartridge embodiment shown as the invention contemplates the application to drive and cartridge types and configurations.

FIG. 1 is a top view of the internal components of disk drive 50. Drive 50 comprises a chassis 57, an actuator 49, a spindle motor 52 and a spindle 40, a load ramps 47, an inertial latch assembly 68. The actuator is itself comprised of three major components: (1) a pair of load beams 44 with (2) a read/write head 46 disposed at the end of each beam, and (3) a coil 43. An ear 48 projects off of the back corner of coil 43 and pin 41 projects downwardly from ear 48. Actuator 49 is driven by a voice coil to pivots about point 11. When actuator 49 is not in use, it is generally retracted to the parked position (as shown). As described more fully below with respect to FIGS. 4A and 4B, inertial latch 22 is pivotally mounted to chassis 57 via pivot pin 27. During normal drive usage, inertial latch 22 is biased to the position shown in the Figure. Accordingly, when actuator 49 is retracted to the parked position, pin 41 of actuator 49 is positioned proximate the inertial latch 22.

A disk cartridge can be inserted into the front of drive 50 in the direction indicated by the arrow. During insertion, the cartridge slides linearly along the top surface of chassis 57 and spindle motor 52 for engagement with the read/write heads 46. A system for disk cartridge hub engagement with the drive is described more fully in copending patent application Ser. No. 08/920,932 (Attorney Docket No. IOM-9556) entitled "MEDIA HUB MOUNTING SYSTEM FOR MINIMIZING Z-AXIS TRANSLATION" filed Aug. 29, 1997, which is hereby incorporated by reference in its entirety.

Figure 2B:
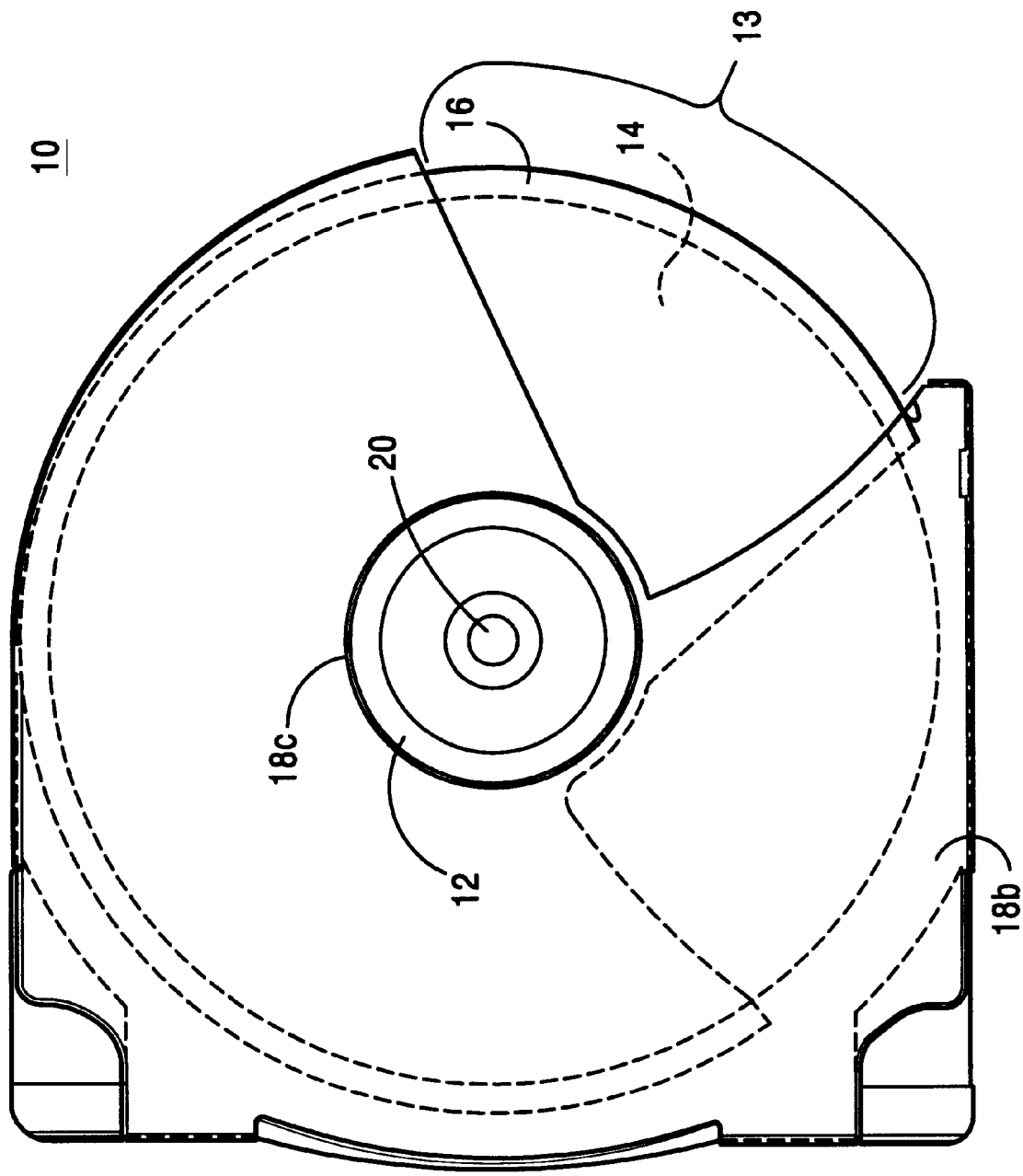
FIG. 2B is a bottom view of an exemplary cartridge for use with the present invention.

FIGS. 2A and 2B present top and bottom views of an exemplary disk cartridge 10 for use with the drive 50. Disk cartridge 10 comprises a flexible magnetic disk 14, a disk media hub 12, top and bottom cartridge shell halves 18a and 18b, a rotary shutter 16, and a shutter pivot pin 20. Shutter 16 rotates within cartridge 10 between an open position and a closed position. In the open position, shutter 16 is rotated away from a generally wedge shaped disk access opening 13 that is formed in cartridge shell 18, exposing the top and bottom surfaces of disk 14 for access by a read/write head or heads contained within a disk drive. In the closed position, shutter 16 is rotated over disk access opening 13, sealing disk cartridge 10 and protecting disk 14. The flexible magnetic disk 14 is formed of a thin polymer film, such as MYLAR, and has a thin magnetic layer uniformly dispersed on the top and bottom surfaces. The magnetic surfaces magnetically sensitize the flexible disk 14 and enable the storage of digital data when the surface is brought into magnetic communication with a magnetic transducer of the type commonly found in disk drives. Disk 14 is generally circular with a circular hole proximate the center of disk 14.

Media hub 12 is firmly secured to disk 14 such that the center of hub 12 is aligned proximate the center of disk 14. Media hub 12 is preferably attached to disk 14 via a well-known adhesive process. The disk and hub assembly are rotatably disposed between upper and lower cartridge shell halves 18a, 18b. Lower cartridge shell half 18b has a substantially circular spindle access opening 18c such that a disk drive can provide rotational power to disk 14 via hub 12.

Figure 3:
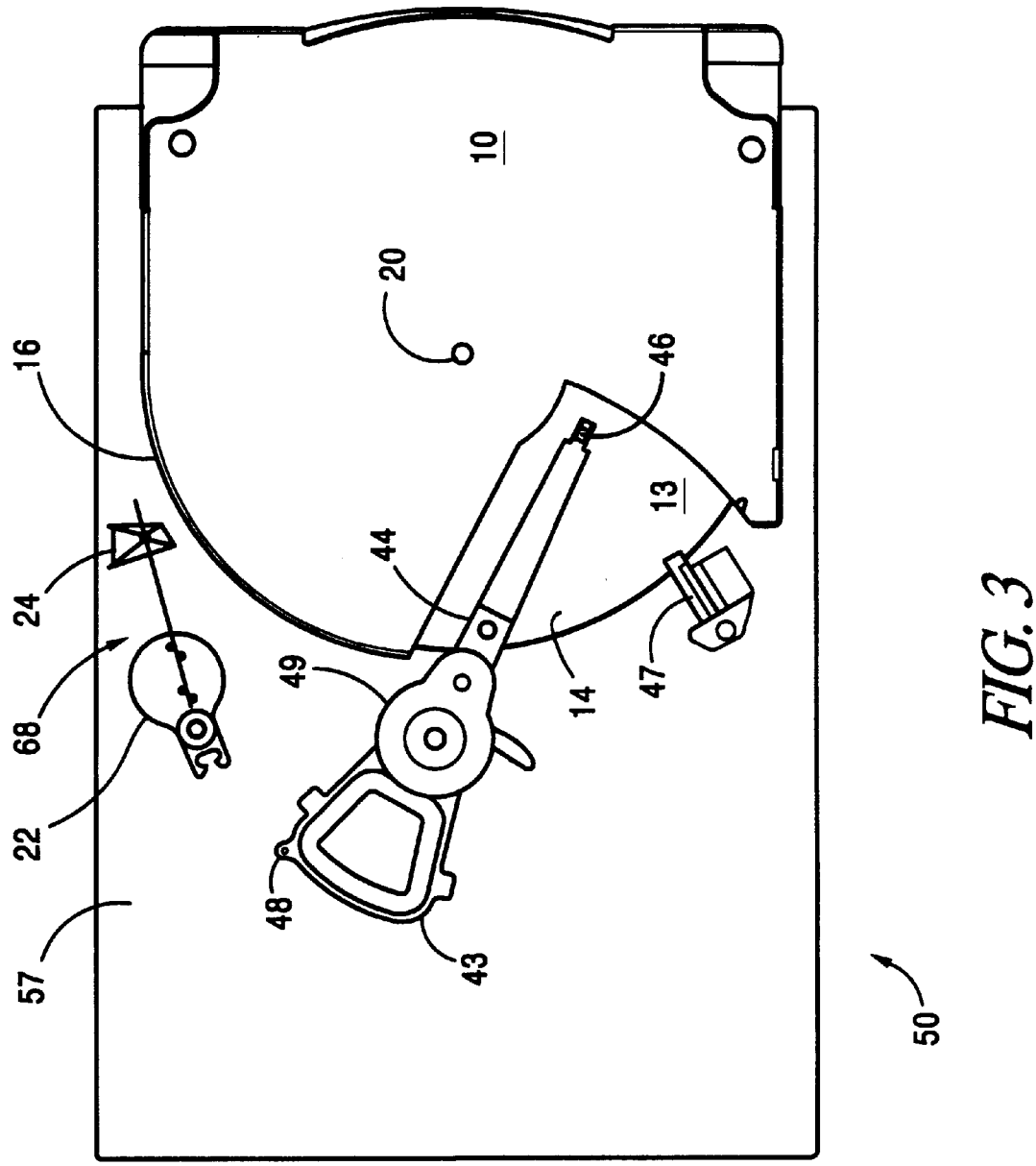
FIG. 3 shows the drive of FIG. 1 with a cartridge of FIGS. 2 in an operational position.

Referring now to FIG. 3, the operation of disk drive 50 in conjunction with a cartridge 10 is illustrated. FIG. 3 shows the positions of the drive mechanisms when a cartridge is fully inserted and the drive is operational. Actuator 49 is now moving its read/write heads 46 across the surface of disk 14, read and writing information. Coil 43 has moved ear 48 away from engagement with inertial latch 22. Thus inertial latch 22 does not perform an actuator restraint function when actuator 49 is out of the parked position, but only performs that function when actuator 49 is parked.

Figure 4A:
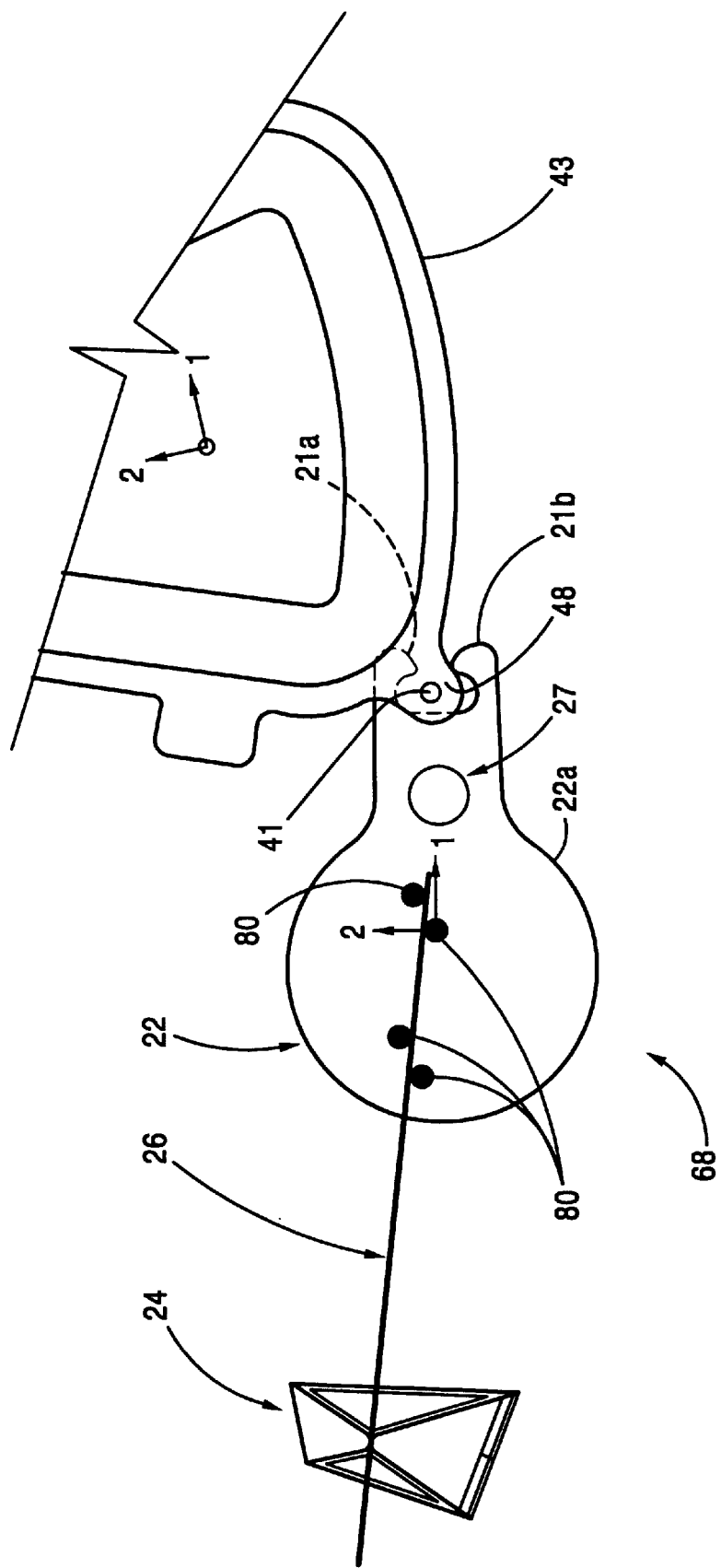
FIG. 4A shows a top plan view of the inertial latch mechanism of the present invention.
Figure 4B:
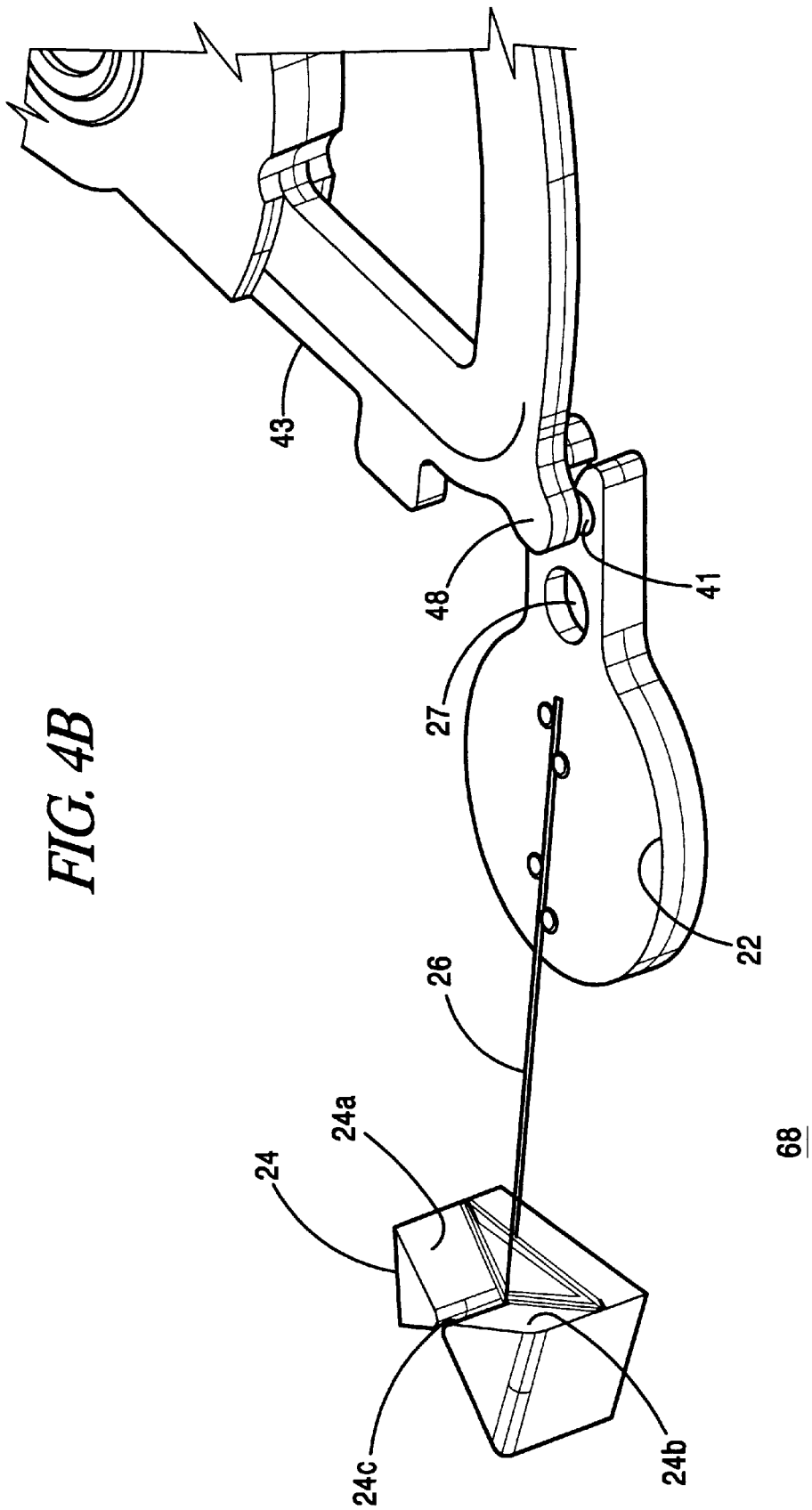
FIG. 4B shows an isometric view of the inertial latch mechanism of the present invention.

Referring now to FIGS. 4A and 4B the inertial latch assembly 68 in accordance with the present invention is shown. FIG. 4A presents a top plan view of the inertial latch assembly. To provide further clarity to the relative position of the inertial latch assembly components, FIG. 4B presents an isometric view. Only a portion of coil 43 is shown, the post shown has ear 48 with downwardly projecting pin 41.

The inertial latch assembly 68 comprises four main components: inertial latch 22, v-block 24, spring rod 26 and downwardly projecting pin 41. Inertial latch 22 comprises four main components: inertial mass 22a, pivot 27, and opposing latch members 21a and 21b. Pivot 27 provides a means for attachment of inertial latch 22 to chassis 57 so that the inertial latch can pivot around pivot 27 when the disk drive undergoes mechanical shocks. V-block 24 comprises opposing wedges 24a and 24b that are separated by gap 24c. Gap 24c is sized slightly larger than the diameter of spring rod 26 so that spring rod 24 can move freely between wedges 24a and 24b within gap 24c. Spring rod 26 is disposed between inertial latch 22 and v-block 24. Rod 26 is fixedly attached to inertial latch 22 through a section of inertial mass 22a. Preferably, rod 26 is attached via a groove cut in the top of inertial mass 22a and is crimped into place by crimps 80. Other well known attachment means are also possible, such as welding, glueing, or casting the rod into inertial mass 22a. Spring rod 26 then extends out from the back of inertial mass 22a and into gap 24c of v-block 24. Spring rod 26 is adapted move relative to the v-block, but spring rod 26 side-to-side movement is constrained between opposing wedges 24a and 24b.

During normal drive operation, the inertial latch assembly 68 remains passive. When actuator 49 moves clockwise into the parked position (as shown in FIG. 1), pin 41, extending downwardly from ear 48, rotates between opposing latch members 21a and 21b. With pin 41 positioned in this way, pin 41 does not engage latch members 21a and 21b. When the actuator moves counter-clockwise to the operational position (as shown in FIG. 3), pin 41 rotates out from between latch members 21a and 21b. However, as explained more fully below with respect to FIGS. 4C and 4D, when the actuator is in the parked position and drive 50 experiences a shock force, one of latch members 21a and 21b captures pin 41 locking the pin in a stable position, thereby preventing the actuator from rotating.

The weight of inertial mass 22a may vary among drive applications. In general, the preferred weight is selected so as to be able to provide a force sufficient to move the actuator back to a parked position when a shock force is experienced. One factor for selecting the weight is the mass and weight distribution of the particular actuator. To that end there is a relationship between the weight of the actuator and the weight of the inertial mass 22a. As the weight of the actuator increases the weight of the inertial mass should increase. For example, with an actuator having a weight in the range of about 0.4 to 0.7 grams force, an inertial mass 22a having a weight in the range of about 0.2 to 1 grams force would work. An inertial latch having a weight in the range of about 0.28 to 0.53 grams force has been found to work effectively for an actuator having a weight of about 0.57 grams force.

Additionally, the weight should be distributed so that, for a shock force of a given magnitude, the latch members will behave substantially the same. That is, the weight of the inertial mass is distributed such that equal rotational force is applied to each latch member for a given shock force. For example, inertial mass 22a is shown as a substantially circular shape. The circular shape works well because its weight is equally balanced on both sides of a line bisecting the inertial latch (not shown). Other shapes could be used with similar results.

Inertial mass 22a is preferably composed of a high density material to reduce the overall geometry required. More preferably the material comprises a metal. For example, brass has been found to exhibit the desired density characteristics, preferably JIF-6040 type brass. Moreover, inertial mass 22a is preferably formed by cutting it from sheet material. More preferably the inertial mass 22a are cut by a stamping process to reduce manufacturing costs while producing high weight and size consistency.

Additionally, substantially all of the weight is distributed on the other side of pivot pin 27 from latch members 21a and 21b. This causes pivot pin 27 to act as a lever by which the weight of inertial mass 22a is applied to latch members 21a and 21b. The force and sensitivity characteristics of the inertial latch assembly 68 could be varied by changing the distance between the center of inertial mass 22a and the center of pivot pin 27.

Another factor effecting the weight of the inertial mass 22a is the spring constant. A spring constant is selected that allows the latch to rotate and engage the pin during shock events resulting from drops that cause the actuator to move off of the load ramps. Furthermore, the spring constant is selected to return the inertial mass 22a to the neutral position after the shock event has passed. For the actuator to move from the load ramps, the forces of friction acting upon the actuator must first be overcome. Hence, such a shock force should also be more than sufficient to rotate the inertial mass 22a against the spring bias and engage pin 41. For example, a spring constant, which is measured just as inertial mass 22a biases spring 26, in the range of about 4 to 30 grams force per millimeter (gf/mm) is suitable for the current application, preferably about 12.5 gf/mm has been found to work with the exemplary inertial mass weight ranges given above.

Referring now to FIG. 4C, a shock force in the direction shown by the arrow has impacted drive 50. As a result, inertial mass 22a has rotated about pivot pin 27 in a counter-clockwise direction. The rotational force of inertial mass 22a has overcome the bias of spring rod 26 and bent rod 26. The bend in rod 26 stores energy to return the inertial mass 22a back to the original position when the shock force passes. Gap 24c permits spring rod 26 to slide between opposing wedges 24a and 24c, providing the additional rod length required by the bowing. When rod 26 returns to the original position, it will again slide within gap 24c.

In addition to bending rod 26, the rotation of inertial mass 22a also cause latch member 21b to close upon pin 41. As a result, actuator 49 is prevented from moving until the shock force passes. In addition, Because of the shape of latch member 21b, and the position of inertial latch 22 relative to the pin 41, the force placed upon pin 41 by inertial mass 22a actuator 49 forces it to return to the parked position. Importantly, actuator 49 is not permitted to travel out from its original position. Therefore, after each shock force, the actuator is in the same relative position. Even if a series of shock forces are experienced, actuator 49 will be returned to the same predetermined position each time the force activates the inertial latch mechanism, and will not travel to a position in which it cannot be latched. After the shock force passes, spring rod 26 biases the inertial mass back the predefined position as shown in FIG. 4A.

Figure 4D:
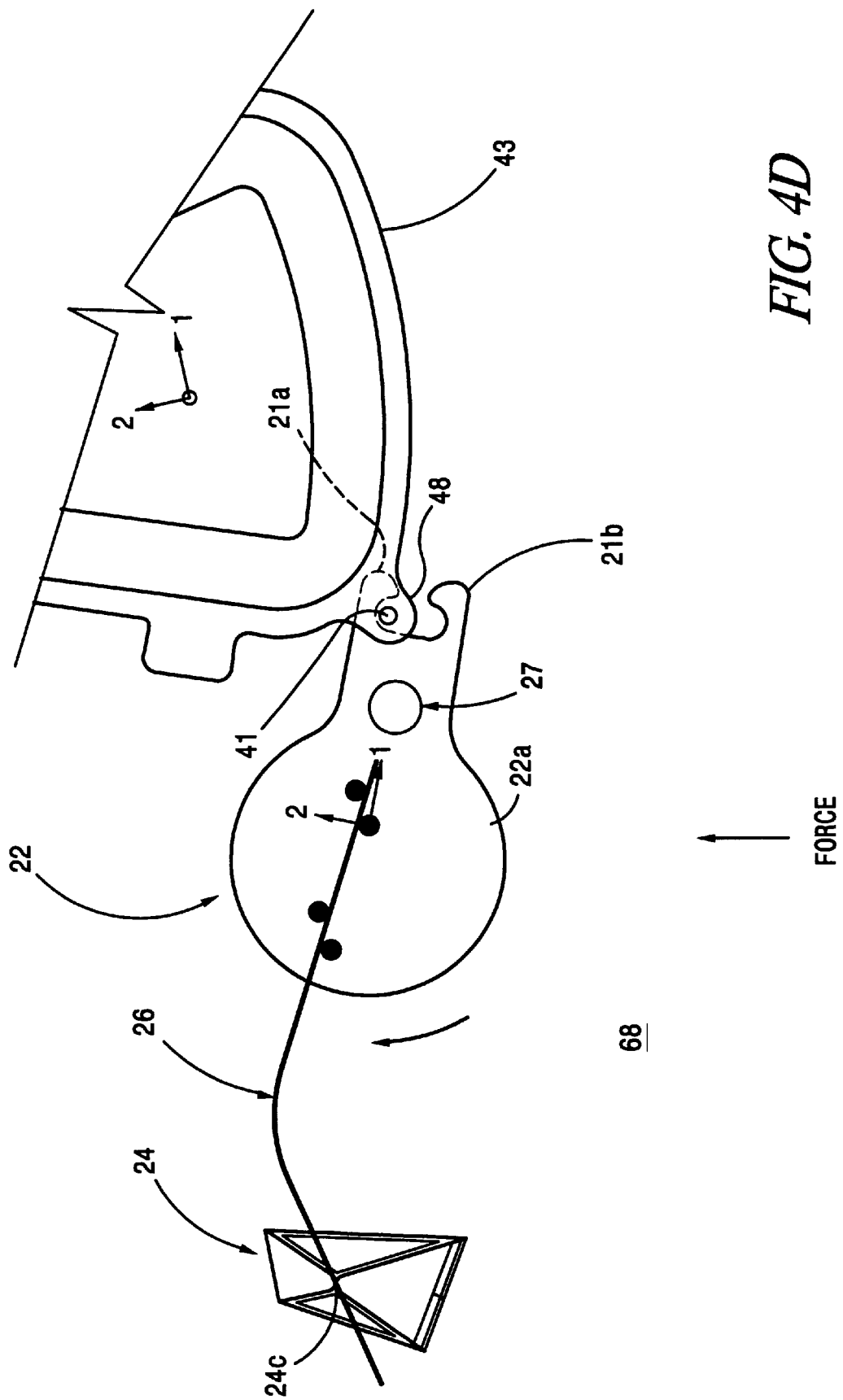

FIG. 4D illustrates the effect of a shock force strike on drive 50 from the opposite direction. As a result, inertial mass 22a rotates in a clockwise direction about pivot pin 27. This time, latch member 21b has engaged pin 41. The result is substantially similar to the effect when latch member 21a engages pin 41. In both cases, the spring rod flexes, although in the opposite directions. In both cases, actuator 49 is forced back to the predetermined position, preventing travel. And, when the force is removed from drive 50, spring rod 26 biases the inertial mass 22a back to the predefined position.

Figure 5A:
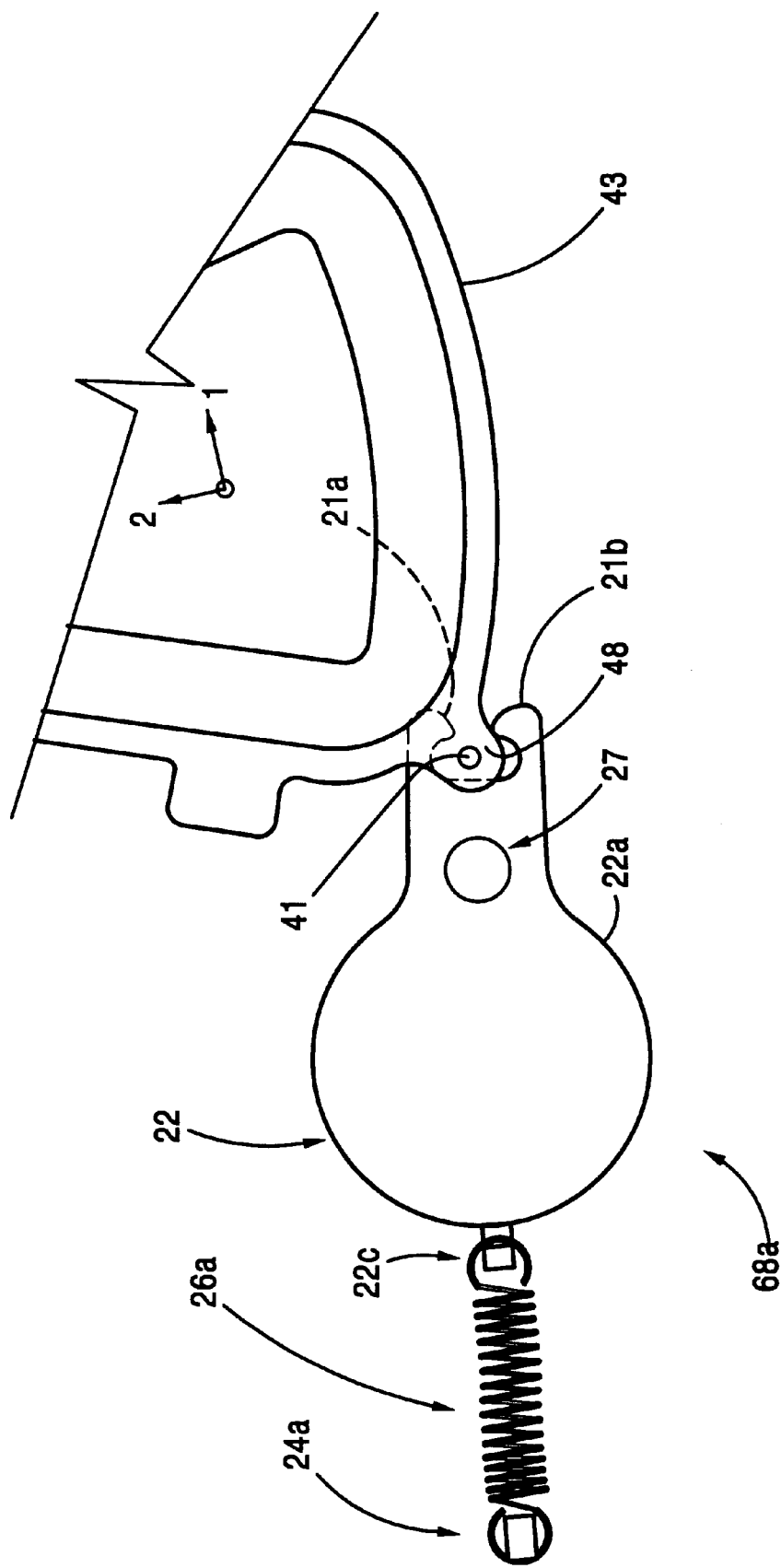
FIG. 5A shows a top plan view of an alternative embodiment of the inertial latch mechanism of the present invention.
Figure 5B:
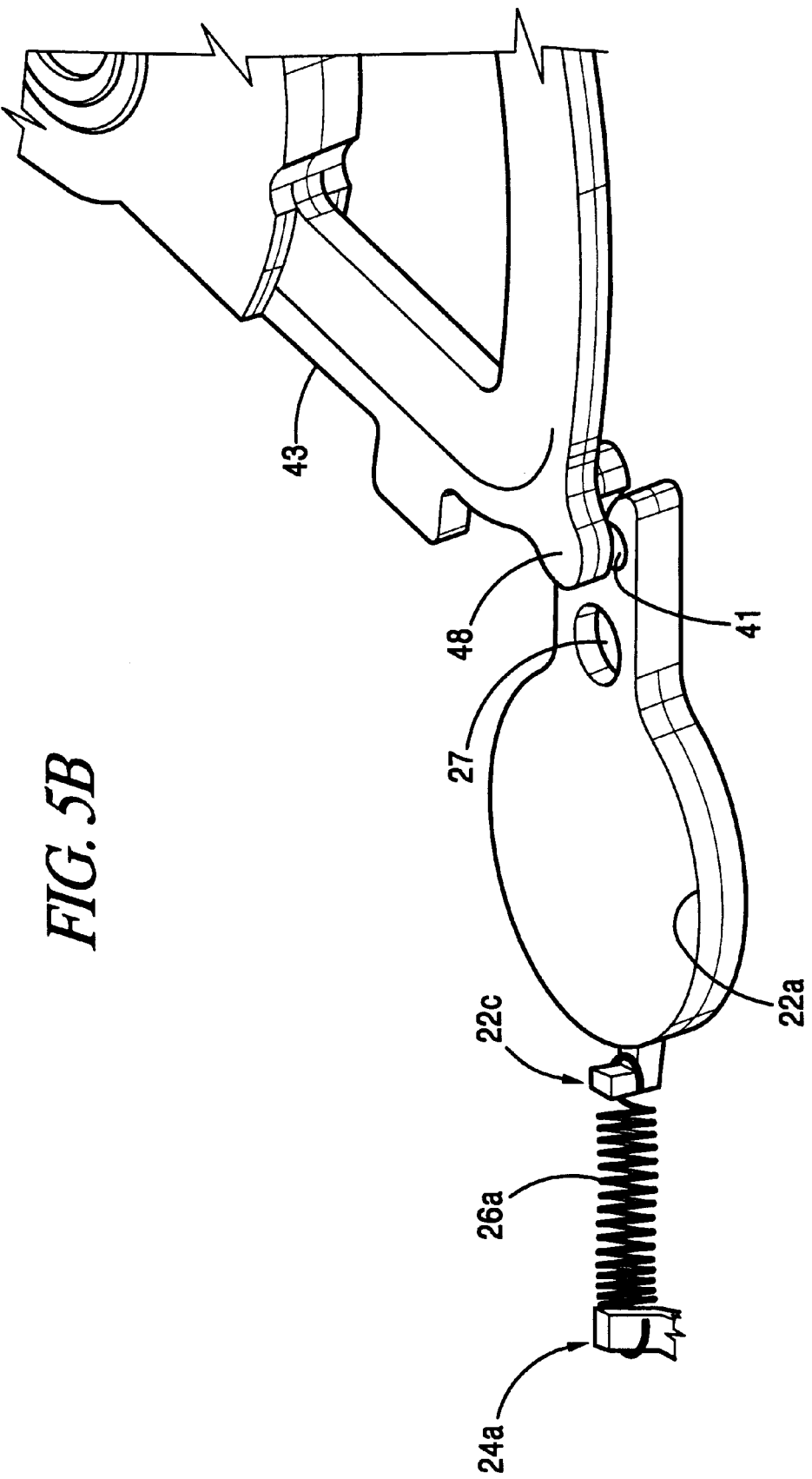
FIG. 5B shows an isometric view of an alternative embodiment of the inertial latch mechanism of the present invention.
Figure 5C:
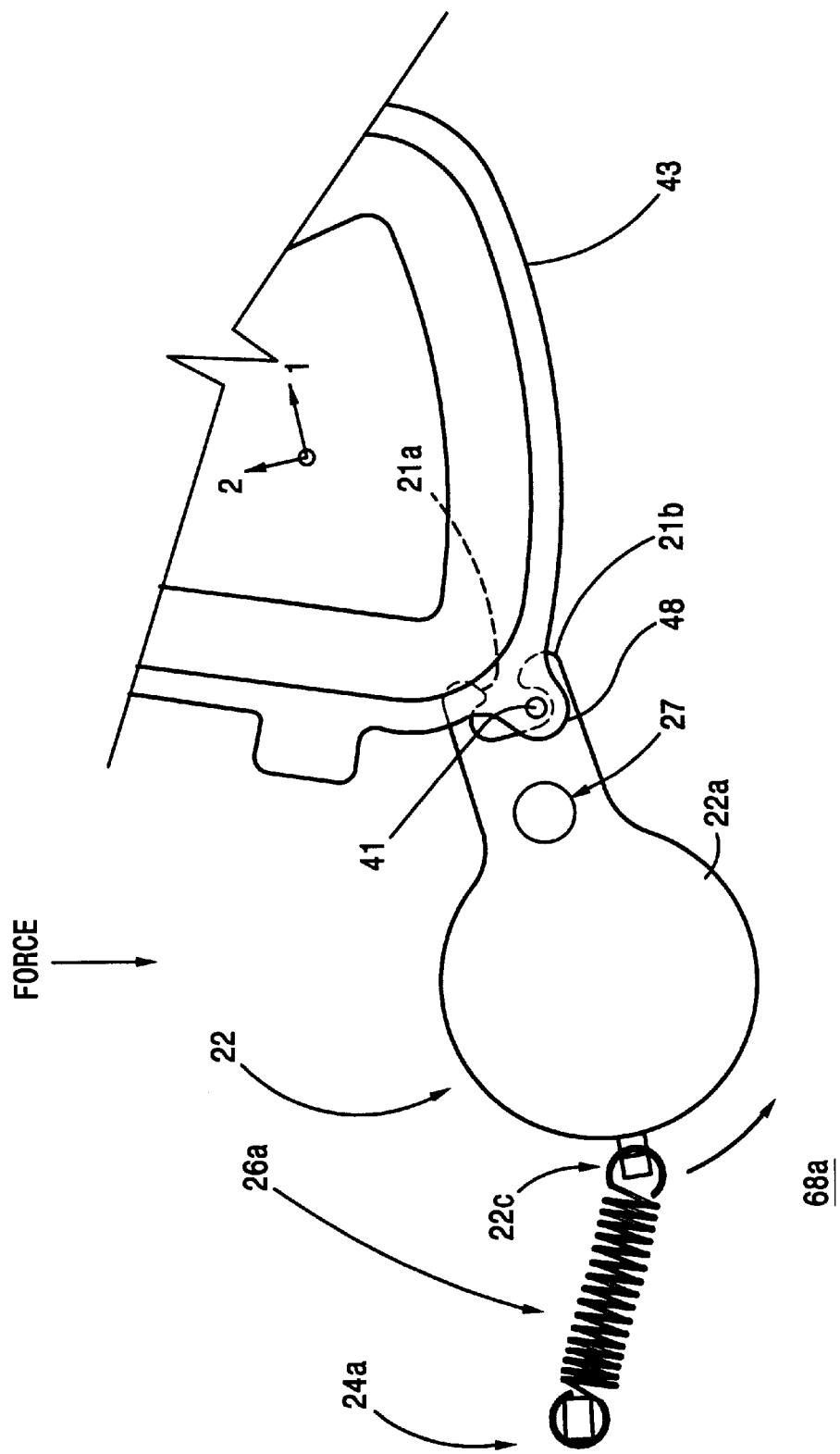
FIG. 5C shows a top plan view of the operation of the alternative embodiment of the inertial latch mechanism in response to a shock force.

FIGS. 5A–5C show inertial latch assembly 68a, an alternative embodiment to the inertial latch assembly 68. FIG. 5A is a top plan view of the inertial latch assembly 68a in a rest condition, i.e., experiencing no external force. To provide further clarity to the relative position of the inertial latch assembly 68a components, FIG. 5B presents an isometric view. And FIG. 5C shows the operation of the alternative latch assembly 68a while drive 50 is experiencing a shock force. The alternative inertial latch assembly 68*a* is similar in most respects to the inertial latch assembly 68 described in reference to FIGS. 4A–4D. The primary difference between inertial latch assemblies 68 and 68*a* is that spring rod 26 has been replaced by extension spring 26*a*.

The inertial latch assembly 68*a* comprises four main components: inertial latch 22, block 24', extension spring 26*a* and downwardly projecting pin 41. Inertial latch 22 comprises four main components: inertial mass 22*a*, pivot 27, and opposing latch members 21*a* and 21*b*. Additionally, inertial latch 22 comprises spring attachment post 22*c*. As with the other embodiment, pivot 27 provides a means for attachment of inertial latch 22 to chassis 57 so that the inertial latch can pivot around pivot 27 when the disk drive undergoes mechanical shocks. Block 24' provides a spring attachment post by which extension spring 26*a* is attached to chassis 57. Hence, extension spring 26*a* extends from the post 22*c* at the back of inertial mass 22*a* to block 24'.

Referring particularly to FIG. 5C, the operation of inertial latch assembly 68*a* is illustrated for an exemplary force, as indicated by the arrow in the Figure. When such a force is experienced, inertial mass 22*a* pivots against the bias of spring 26*a*. Thereafter, when the force ceases, the bias of spring 26*a* returns mass 22*a* to the rest position.

The above description of preferred embodiments is not intended to impliedly limit the scope of protection of the following claims. Thus, for example, except where they are expressly so limited, the following claims are not limited to applications involving disk drive systems.

What is claimed is:

1. An apparatus for restraining an actuator for use in a disk drive, comprising:
    an inertial latch body, said inertial latch body comprising:
        an inertial mass having a majority mass of said inertial latch body; and
        opposing latch members coupled to said inertial mass for capturing said actuator while experiencing mechanical shocks to thereby prevent actuator travel; and
    a spring for maintaining said inertial latch body in a predefined position in the absence of a mechanical shock and returning said inertial latch body to said predefined position after movement due to mechanical shock;
    wherein said inertial latch body is pivotally attached to said disk drive at a pivot point such that said inertial mass and said latch members are located on opposite sides of said pivot point so that said majority mass of said inertial latch body is opposite said latch members.

2. The apparatus as recited in claim 1 wherein said spring comprises an extension spring.

3. The apparatus as recited in claim 2 wherein said spring comprises a flexible rod.

4. The apparatus as recited in claim 3 further comprising a v-block having two opposing side walls separated by a gap, wherein said rod is coupled on one end to said inertial mass and extends into said gap between said side walls on another end.

5. The apparatus as recited in claim 1 wherein said actuator comprises a downwardly extending pin and wherein said latch members are adapted to engage said pin when said inertial mass rotates.

6. The apparatus as recited in claim 5 wherein at least one of said latch members comprises a cammed end adapted to engage said downwardly extending pin.

7. The apparatus as recited in claim 5 wherein said downwardly extending pin is coupled to said actuator proximate a rear corner.

8. The apparatus as recited in claim 1 wherein said inertial mass has a weight selected so as to be able to move said actuator when a shock force is applied to said disk drive.

9. The apparatus as recited in claim 1 wherein the inertial mass comprises a high density metal.

10. The apparatus as recited in claim 9 wherein the metal comprises brass.

11. The apparatus as recited in claim 9 wherein the inertial mass is stamped from sheet material.

12. The apparatus as recited in claim 1 wherein the inertial mass has a weight in the range of about 0.2 to 1 grams force.

13. The apparatus as recited in claim 1 wherein the inertial mass has a weight in the range of about 0.28 to 0.53 grams force.

14. The apparatus as recited in claim 1 wherein the spring has a spring constant in the range of about 4 to 30 grams force per millimeter.

15. The apparatus as recited in claim 14 wherein the spring constant is about 12.5 grams force per millimeter.

\* \* \* \* \*